INVENTORS:
JOACHIM CIONGWA
WOLFGANG SÜSHARDT
BY Michael S. Striker,
ATTORNEY

Oct. 28, 1969     J. CIONGWA ET AL     3,474,894
TRANSPORTING ARRANGEMENT FOR BOTTLES OR THE LIKE IN A
BOTTLE CLEANING APPARATUS

Filed Dec. 12, 1967     2 Sheets-Sheet 2

INVENTORS:
JOACHIM CIONGWA
WOLFGANG SUSHARDT
BY
ATTORNEY

United States Patent Office 3,474,894
Patented Oct. 28, 1969

3,474,894
TRANSPORTING ARRANGEMENT FOR BOTTLES OR THE LIKE IN A BOTTLE CLEANING APPARATUS
Joachim Ciongwa, Dortmund-Wambel, and Wolfgang Süshardt, Dortmund-Huckarde, Germany, assignors to Holstein & Kappert Maschinenfabrik Phonix GmbH, Dortmund, Germany
Filed Dec. 12, 1967, Ser. No. 689,914
Claims priority, application Germany, Dec. 14, 1966, H 61,284
Int. Cl. B65g 17/16
U.S. Cl. 198—131                                    8 Claims

ABSTRACT OF THE DISCLOSURE

A transporting arrangement for bottles or the like in a bottle cleaning apparatus in which a plurality of elongated bottle carriers of U-shaped profile, each adapted to support a row of adjacent bottles, are carried at opposite ends thereof on a pair of conveyor chains guided over sprocket wheels, and in which the carriers are arranged and the profiles thereof constructed so that adjacent carriers are in any position in contact with each other without interfering with each other during passage of the chains and the carriers carried thereby over the sprocket wheels.

BACKGROUND OF THE INVENTION

The present invention relates to a transporting arrangement for bottles or the like for transporting the bottles through a bottle cleaning apparatus in which a plurality of elongated bottle carriers of U-shaped profile, each adapted to support a row of adjacent bottles, are carried at opposite ends thereof on a pair of conveyor chains which are preferably in form of an endless path guided over sprocket wheels to be transported through the bottle cleaning apparatus.

In order to assure a proper cleaning of the bottles, as well as a trouble-free operation of the bottle cleaning machine, it is necessary that the bottle carriers in loaded condition bend or sag as little as possible. For this purpose it has already been suggested that the elongated carrier be constructed in such a manner that its moment of resistance against bending uniformly increases from the opposite ends toward the center of the elongated carrier. Such carriers usually are formed of beams of U-shaped profile, the length of the legs of which gradually increases from the opposite ends of the beam toward the center thereof.

Such carrier constructions are satisfactory for medium size bottle cleaning machines. However, in very large bottle cleaning machines in which the elongated bottle carriers have a considerable span, the elongated carriers become too heavy if they are constructed with sufficient rigidity. In addition, these carriers which have a substantially rectangular profile have to be mounted on the conveyor chains of the apparatus properly spaced from each other so that adjacent carriers as they are transported by the conveyor chains do not interfere with each other while the conveyor chains pass over the sprocket wheels. This means that adjacent carriers will not abut against and thus support each other, so that the carriers during upward movement on a vertical chain run, in which the carriers are stressed in direction normal to a longitudinal plane of symmetry thereof, that is in the direction in which they have the smallest bending resistance, will bend considerably whereby a permanent deformation or distortion of the elongated carriers may result.

It is an object of the present invention to provide elongated bottle carriers of the aforementioned kind which are constructed and arranged to overcome the aforementioned drawbacks of such bottle carriers known in the art.

It is a further object of the present invention to provide for bottle carriers of the aforementioned kind, the profiles of which are constructed in such a manner that adjacent carriers on the conveyor chains are in any position in contact with other without interfering with each other during passage of the chains and the carriers carried thereby about sprocket wheels.

SUMMARY OF THE INVENTION

With these objects in view, the transporting arrangement according to the present invention for bottles or the like in a bottle cleaning apparatus mainly comprises a pair of conveyor chains extending substantially parallel and spaced from each other, a plurality of sprocket wheels about which the conveyor chains are guided, and a plurality of elongated bottle carriers of substantially U-shaped profile respectively carried at opposite ends on said conveyor chains extending closely adjacent to each other transverse to the longitudinal direction of the chains in which the carriers are arranged and their profiles constructed so that adjacent carriers are in any position in contact with each other without interfering with each other during passage of the chains and the carriers carried thereby about the sprocket wheels.

The profile of the carrier according to the present invention has a base and a pair of opposite legs respectively projecting from opposite ends of the base and each of the legs is substantially V-shaped, with the V opening of one leg facing the V opening of the opposite leg and with the apex of each V in a transverse plane of symmetry of each elongated carrier located in one plane with the longitudinal axes of the respective chain links. The portion of each leg which is adjacent to the base includes with the latter preferably an angle so that during passage of a carrier about a sprocket wheel with the base of the carrier facing the axis of the sprocket wheel, the aforementioned portion of each leg is parallel to a radius of the sprocket wheel passing through the apex of the V-shaped leg. Preferably, the second portion of each leg which projects away from the apex includes with a line normal to the base and passing through the apex an angle which is equal to the angle included between a plane of symmetry of said profile and the first-mentioned leg portion.

Preferably, the height of the legs of the U-shaped profile increases from opposite ends of the elongated carrier towards the center of the latter so that the elongated carrier has a uniform bending resistance throughout its length.

Each carrier may also include a plurality of transverse webs extending spaced from each other through the U-shaped profile of the carrier and being respectively fixed to the opposite legs thereof so as to increase the rigidity of each carrier.

A carrier according to the present invention will provide extreme rigidity even for very great span lengths, as necessary for modern bottle cleaning apparatus with a large output.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
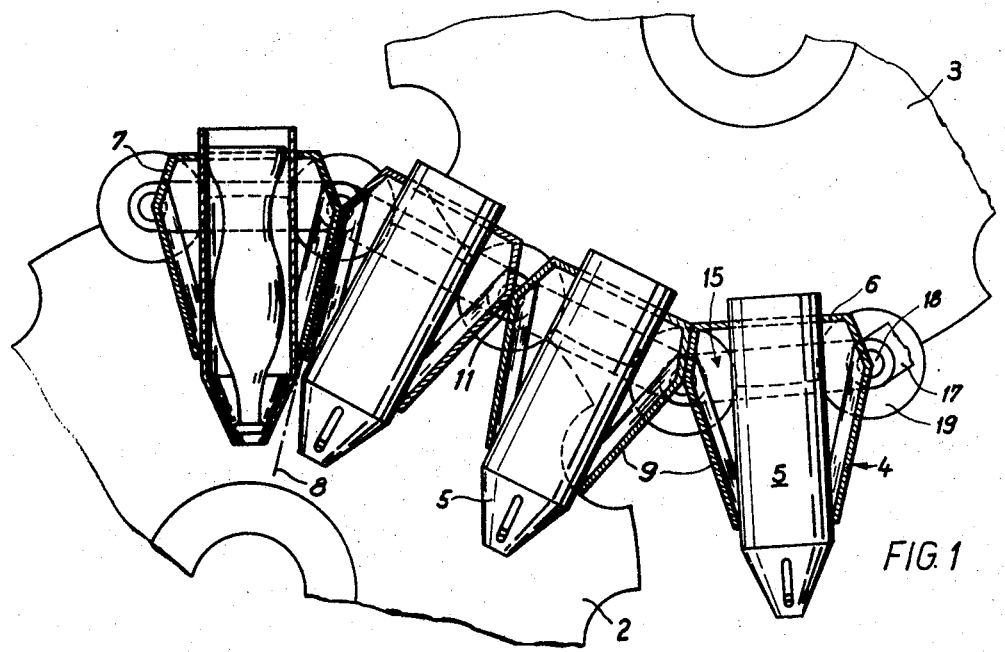
FIG. 1 is a schematic longitudinal cross section through the transporting arrangement according to the present invention and illustrating the conveyor chains and the bottle carriers carried thereby passing over adjacent sprocket wheels.

Referring now to the drawing, it will be seen that the transporting arrangement according to the present invention comprises a pair of conveyor chains 1, only one of which is schematically illustrated in the drawing, which conveyor chains extend substantially parallel and spaced from each other and are guided over a plurality of sprocket wheels, only two of which, that is the sprocket wheels 2 and 3 are schematically illustrated in FIG. 1 so that the chains 1 are guided along a predetermined path through a bottle cleaning apparatus, not shown in the drawing. The specific construction of the chains, which are only schematically shown in the drawing, does not form part of the present invention, and each chain includes a plurality of elongated links 17 pivotally connected at adjacent ends to each other, and the pivot pins 18 which connect adjacent links 17 to each other carry small rollers 19 riding on appropriate guide rails 20 for supporting the chains especially during passage of the chains along a horizontal path. A plurality of elongated bottle carriers 4, each provided with a plurality of bottle compartments 5 of known construction, not forming part of the present invention, are carried at opposite ends thereof on the links 17 of the conveyor chains 1—for instance by means of two angular portions 21 and 22 and a screw 23— extending closely adjacent to each other and transverse to the longitudinal direction of the chains. Each of the bottle carriers 4 has a substantially U-shaped profile having a base 6 and a pair of opposite legs respectively projecting from opposite ends of the base and each being substantially V-shaped with the V opening of one leg facing the V opening of the opposite leg. A first portion 7 of each leg, that is the portion adjacent the base, includes with the latter an angle so that, as clearly shown in FIG. 1, during passage of a carrier 4 about a sprocket wheel with the base of the carrier facing the axis of the sprocket wheel, the leg portion 7 of each leg is parallel to a radius of the respective sprocket wheel passing through the apex 11 of the V-shaped leg. The second portion 9 of each leg, which projects away from the apex 11, includes with a line normal to the base 6 and passing through the apex 11 an angle 14 which is equal to the angle included between a plane of symmetry 10 of the profile and the first leg portion 7. The apexes 11 in a transverse plane of symmetry of the elongated carrier are located in a common plane with the longitudinal axes 12 of the respective chain links.

Figure 4:
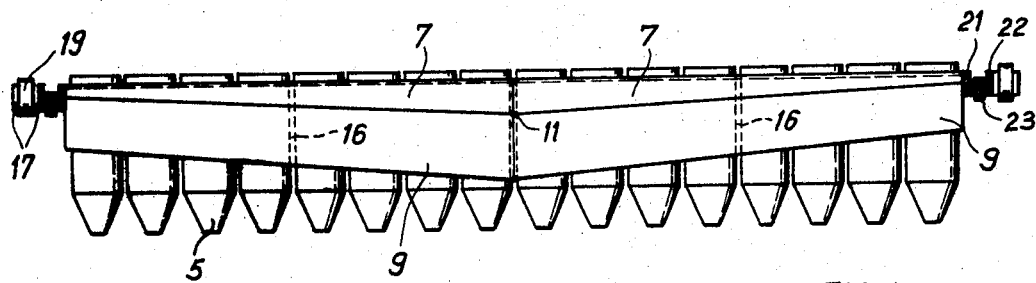
FIG. 4 is a side view of one of the bottle carriers and drawn to a reduced scale.
Figure 3:
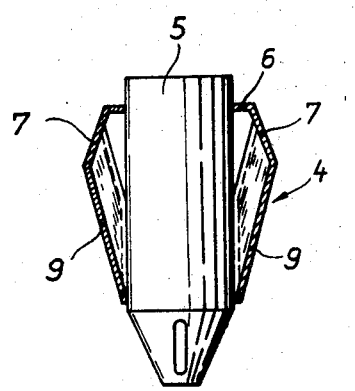
FIG. 3 is a transverse cross section through one of the bottle carriers.

Each of the elongated carriers 4 is preferably constructed so as to have uniform bending resistance throughout its length, that is the height of the legs 7, 9 uniformly increases from opposite ends of the elongated carrier towards the center of the latter, as clearly shown in FIG. 4.

Figure 2:
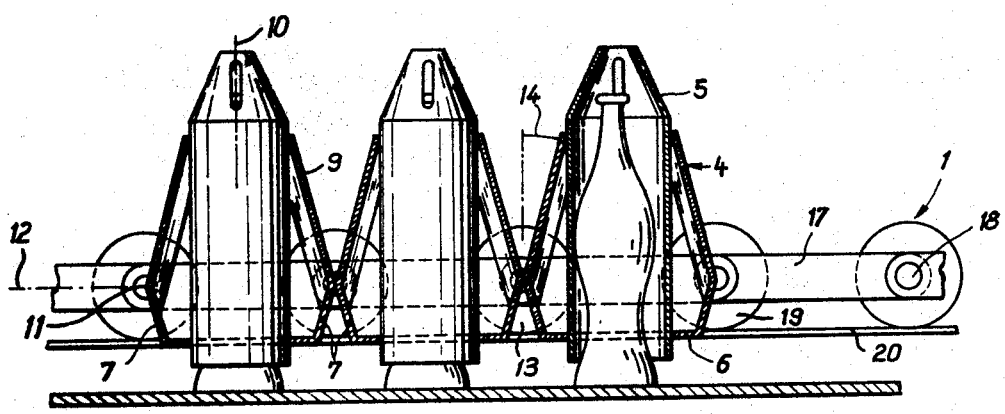
FIG. 2 is a partial longitudinal cross section similar to FIG. 1 in which the chain extends along a horizontal path.

The geometrical configuration of the profile of the elongated carrier 4 permits to arrange the carriers so closely to each other that the legs of adjacent carriers will be in contact with each other at the points 11. The wedge-shaped spaces 13 forming between the legs on adjacent carrier 4 during movement of the carriers along a horizontal path, as shown in FIG. 2, permit the carriers 4 to follow the chains 1 when the latter are guided about sprocket wheels 2 and 3, as schematically shown in FIG. 1, in such a manner that adjacent carriers do not interfere with each other or become wedged. At the same time the profile configuration according to the present invention permits to arrange adjacent carriers so closely to each other that the adjacent carriers will abut against each other regardless of the position of the chain links which respectively support the carriers so that especially during movement of the carriers along a vertical path, each carrier will be supported on the carrier adjacent thereto so that the carriers may also withstand a load in direction of the chain axis without bending.

To increase the stiffness of each carrier 4 a plurality of transverse webs 16 may be provided which extend spaced from each other transversely through the profile opening 15 and which are respectively fixed in any manner known in the art to opposite legs of the profile. The leg portions 9 are preferably long enough so as to engage at the free ends thereof the walls of the bottle compartment 5 to support the latter.

It will be understood that each of the elements described above, or two or more together, may also find a useful application in other types of transporting arrangement for bottles or the like including a plurality of elongated bottle carriers of U-shaped profile differing from the types described above.

While the invention has been illustrated and described as embodied in a transporting arrangement for bottles or the like in a bottle cleaning apparatus including a plurality of elongated bottle carriers of substantially U-shaped profile in which the profiles are constructed so that adjacent carriers are in any position in contact with each other without interfering with each other during passage of the chains which carry the carriers about sprocket wheels, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

What is claimed is:

1. A transporting arrangement for bottles or the like in a bottle cleaning apparatus comprising, in combination, a pair of conveyor chains extending substantially parallel and spaced from each other; a plurality of sprocket wheels about which said conveyor chains are guided; and a plurality of elongated bottle carriers of substantially U-shaped profile respectively carried at opposite ends on said conveyor chains extending closely adjacent to each other transverse to the longitudinal direction of the chains, each of said profiles having a portion of maximum width extending in the direction of said chains and tapering to opposite sides from said portion of maximum width, the portion of maximum width of each carrier profile being in constant contact with corresponding portions of the carrier profiles adjacent thereto and the tapering portions will prevent interference of adjacent carriers with each other during passage of said chains and said carriers carried thereby about said sprocket wheels.

2. A transporting arrangement as defined in claim 1, wherein each conveyor chain has a plurality of elongated links pivotally connected at adjacent ends to each other, and wherein each carrier profile has a base and a pair of opposite legs respectively projecting from opposite ends of said base, each of said legs being V-shaped with the V opening of one leg facing the V opening of the opposite leg and with the apex of each V in a transverse plane of symmetry of each carrier located in one plane with the longitudinal axes of the respective chain links.

3. A transporting arrangement as defined in claim 2, wherein a first portion of each leg, which is adjacent the base, includes with said base an angle so that during passing of the chains and the carriers carried thereby about a sprocket wheel with the base of the carrier facing the axis of the sprocket wheel, said portion of each leg is parallel to a radius of said sprocket wheel passing through the apex of the V-shaped leg.

4. A transporting arrangement as defined in claim 3, wherein a second portion of each leg, which projects away from said apex, includes with a line normal to said base and passing through said apex an angle which is equal to the angle included between a plane of symmetry of said profile and said first leg portion.

5. A transporting arrangement as defined in claim 2, wherein the height of said legs of said U-shaped profile increases from opposite ends of said elongated carrier towards the center of the latter so that said elongated carrier has a uniform bending resistance throughout its length.

6. A transporting arrangement as defined in claim 4, wherein the height of the legs of said U-shaped profile increases from opposite ends of said elongated carrier towards the center of the latter so that said elongated carrier has a uniform bending resistance throughout its length.

7. A transporting arrangement as defined in claim 1, and including a plurality of transverse webs extending spaced from each other through said U-shaped profile of said carrier.

8. A transporting arrangement as defined in claim 6, and including a plurality of transverse webs extending spaced from each other through said U-shaped profile and being respectively fixed at opposite ends to said opposite legs.

References Cited

UNITED STATES PATENTS

| | | | |
|---|---|---|---|
| 2,444,925 | 7/1948 | Fischer | 198—131 |
| 2,984,334 | 5/1961 | Dungfelder | 198—131 |

RICHARD E. AEGERTER, Primary Examiner